United States Patent
Alsubaity

(10) Patent No.: US 11,939,965 B2
(45) Date of Patent: Mar. 26, 2024

(54) USE OF CONCENTRATED SOLAR TO ENHANCE THE POWER GENERATION OF THE TURBOEXPANDER IN GAS WELLS

(71) Applicant: SAUDI ARABIAN OIL COMPANY, Dhahran (SA)

(72) Inventor: Basel Ata Alsubaity, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/711,155

(22) Filed: Apr. 1, 2022

(65) Prior Publication Data

US 2023/0313784 A1 Oct. 5, 2023

(51) Int. Cl.
| | |
|---|---|
| *F03G 6/06* | (2006.01) |
| *E21B 36/00* | (2006.01) |
| *F03G 4/00* | (2006.01) |
| *F24S 20/20* | (2018.01) |
| *F24S 23/74* | (2018.01) |

(52) U.S. Cl.
CPC .......... *F03G 6/067* (2013.01); *E21B 36/005* (2013.01); *F03G 4/00* (2021.08); *F24S 20/20* (2018.05); *F24S 23/74* (2018.05)

(58) Field of Classification Search
CPC .......... F03G 6/067; F03G 4/00; E21B 36/005; F24S 20/20; F24S 23/74
USPC .......... 60/641.2–641.4, 641.8–641.15, 650, 60/682–684
See application file for complete search history.

(56) References Cited

U.S. PATENT DOCUMENTS

| | | | |
|---|---|---|---|
| 3,342,267 | A | 9/1967 | Cotter et al. |
| 3,827,243 | A * | 8/1974 | Paull ............ E21B 43/16 166/272.6 |
| 4,099,381 | A * | 7/1978 | Rappoport ......... F03G 6/067 60/641.1 |
| 4,110,628 | A | 8/1978 | Paull et al. |
| 4,369,373 | A | 1/1983 | Wiseman |
| 6,776,227 | B2 | 8/2004 | Beida et al. |
| 7,579,703 | B2 | 8/2009 | Shifrin |
| 8,680,704 | B1 | 3/2014 | Rooney |
| 9,394,780 | B2 | 7/2016 | Bruce et al. |

(Continued)

OTHER PUBLICATIONS

Taleshian, Mehdi, et al. "Modeling and power quality improvement of turbo-expander driving an induction generator", In2011 19th Iranian Conference on Electrical Engineering, IEEE. May 17, 2011, pp. 1-6 [6 Pages].

(Continued)

*Primary Examiner* — Hoang M Nguyen
(74) *Attorney, Agent, or Firm* — Osha Bergman Watanabe & Burton LLP

(57) ABSTRACT

A system and a process for producing gas and generating power is disclosed herein. The system may be configured to include a produced gas, a production pipe, an indirect heat exchange system, a heat exchange medium, a concentrated solar power system, an energy conversion device, and a heat exchange circulation system. The process may include producing a gas from a reservoir that has a first temperature, heating the produced, via indirect heat exchange with a heat exchange medium, to a second temperature. This indirect heat exchange may produce a cooled heat exchange medium that may be heated again via concentrated solar power. The heated produced gas may be then expanded across an energy conversion device to produce electricity.

18 Claims, 2 Drawing Sheets

(56) References Cited

U.S. PATENT DOCUMENTS

| | | | | |
|---|---|---|---|---|
| 9,850,878 | B2* | 12/2017 | Newman | F24S 60/10 |
| 10,458,206 | B2 | 10/2019 | Al-Dossary et al. | |
| 2006/0048770 | A1 | 3/2006 | Meksvanh et al. | |
| 2008/0000231 | A1* | 1/2008 | Litwin | F24S 80/20 |
| | | | | 60/641.11 |
| 2011/0233192 | A1* | 9/2011 | Parman | E21B 36/04 |
| | | | | 219/548 |
| 2013/0098035 | A1* | 4/2013 | McAlister | F24S 23/74 |
| | | | | 60/641.7 |
| 2013/0112394 | A1 | 5/2013 | O'Donnell et al. | |
| 2014/0223906 | A1* | 8/2014 | Gee | F01K 3/24 |
| | | | | 60/641.15 |
| 2016/0047212 | A1 | 2/2016 | Vinegar et al. | |
| 2016/0047361 | A1* | 2/2016 | Al-Sulaiman | F01K 23/06 |
| | | | | 60/641.15 |
| 2017/0141724 | A1 | 5/2017 | O'Donnell et al. | |
| 2018/0320512 | A1* | 11/2018 | Anisur Rahman | E21B 41/0092 |
| 2022/0021336 | A1* | 1/2022 | Younes | F24S 10/00 |

OTHER PUBLICATIONS

Ristanovic, Dragan, et al. "Turbo-expander generators for supplemental power generation in LNG liquefaction plants", IEEE Transactions on Industry Applications. Jul. 29, 2020, pp. 6094-6103 [10 Pages].

Soltan, Shaimaa Tarek, et al. "Recovering lost power in natural gas pressure reduction stations using hybrid turbo expander and fuel cell systems", In2017 Nineteenth International Middle East Power Systems Conference (MEPCON), IEEE. Dec. 19, 2017, pp. 681-986 [6 Pages].

\* cited by examiner

USE OF CONCENTRATED SOLAR TO ENHANCE THE POWER GENERATION OF THE TURBOEXPANDER IN GAS WELLS

BACKGROUND

Hydrocarbon resources, including oil and gas, are typically located below the surface of the earth in subterranean porous rock formations. To access these resources, wells are drilled to extract the hydrocarbon fluids from the reservoir. After the well is drilled and completed, hydrocarbons are extracted using conventional systems. In gas wells, the extracted hydrocarbon may be in the gaseous phase where the extracted or produced gas is at a high temperature and a high pressure. Such high-pressure gas is then utilized to produce power by converting the kinetic energy into electricity before sending the low-pressure produced gas for further processing. This kinetic energy conversion process comprises at least an energy conversion device.

Accordingly, there exists a need for improving the efficiency of kinetic energy conversion of extracted gas in gas wells.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a process for producing gas and generating power. A gas may be produced from an underground reservoir such that the produced gas has a first temperature. The produced gas may be heated, via indirect heat exchange with a heat exchange medium, to a second temperature. This indirect heat exchange may include producing a heated produced gas and a cooled heat exchange medium. The cooled heat exchange medium may then be heated again via concentrated solar power. The heated produced gas may be then expanded across an energy conversion device to produce electricity.

In another aspect, embodiments disclosed herein relate to a system for producing gas and generating power. The system may include a produced gas, a production pipe, an indirect heat exchange system, a heat exchange medium, a concentrated solar power system, an energy conversion device, and a heat exchange circulation system. The production pipe may be utilized for transporting a produced gas from a wellhead to an energy conversion device. The indirect heat exchange system may be used for heating the produced gas intermediate the wellhead and the energy conversion device. The concentrated solar power system may be used for heating a heat exchange medium. The heat exchange circulation system may be utilized for circulating the heat exchange medium through the indirect heat exchange system.

Other aspects and advantages of the claimed subject matter will be apparent from the following description and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

Figure 1:
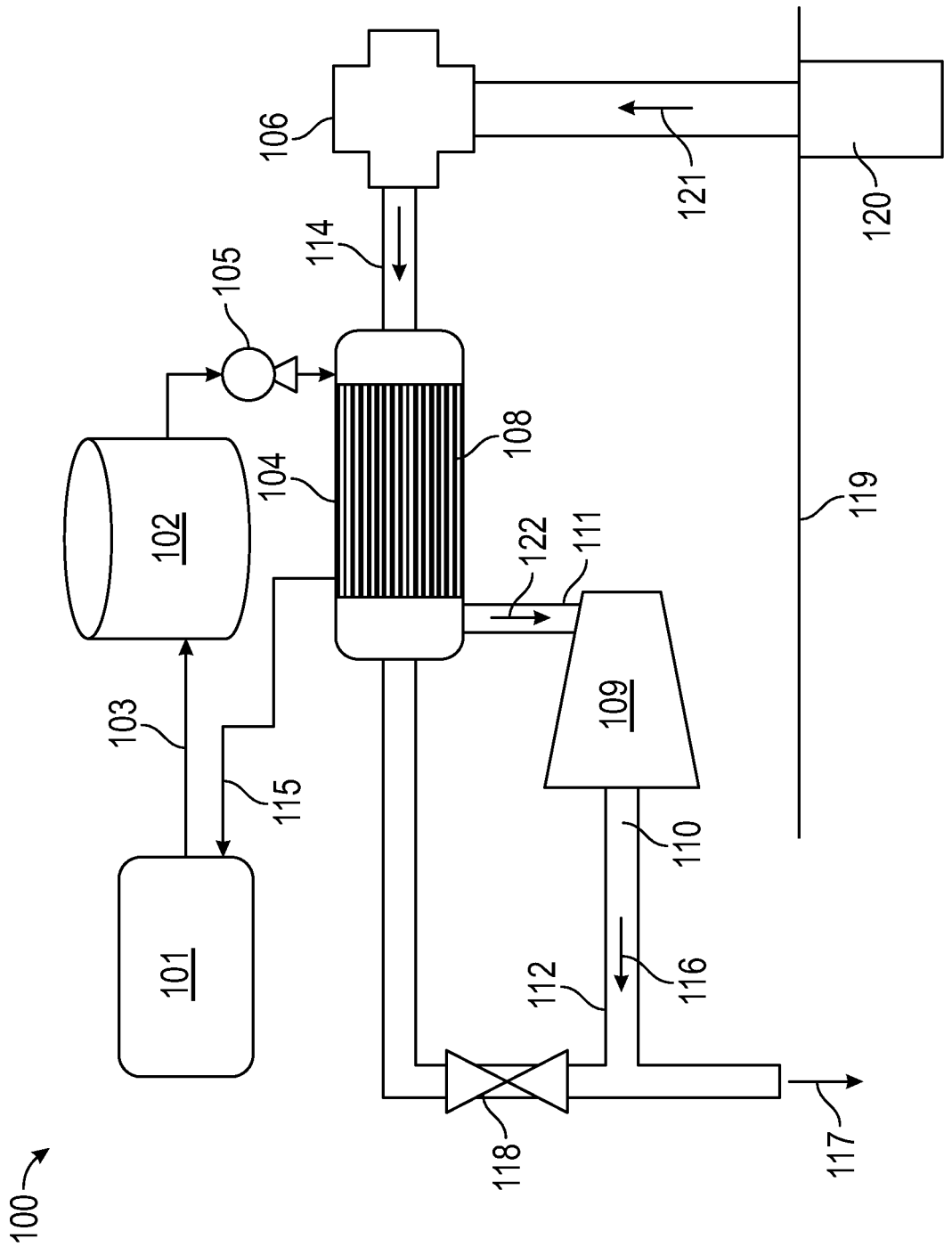
FIG. 1 illustrates an example configuration of a system for enhancing power generation in gas wells in accordance with one or more embodiments of the present disclosure.

In the figures, down are toward or at the bottom, and up are toward or at the top of the figure. "Up" and "down" are generally oriented relative to a local vertical direction. However, "upstream" may more generally refer to objects, units, or processes taken before a particular unit or process. As well, "downstream" may more generally refer to objects, units, or processes taken after a particular unit or process.

DETAILED DESCRIPTION

Certain embodiments of the present disclosure will be described in detail with reference to the accompanying figures. It should be understood, however, that the accompanying figures illustrate the various implementations described and are not meant to limit the scope of various technologies described. Further, in the following detailed description of embodiments of the present disclosure, numerous specific details are set forth in the following detailed description in order to provide a more thorough understanding of embodiments of the present disclosure. However, it will be apparent to one of ordinary skill in the art that the present disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and succeed (or precede) the second element in an ordering of elements.

Embodiments disclosed herein relate generally to the use of concentrated solar energy to enhance the power generation of an energy conversion device in gas wells. Power may be generated by utilizing the kinetic energy of a produced gas. The temperature of the produced gas may impact the efficiency and performance of the energy conversion device. The efficiency and performance of the energy conversion device may be significantly improved by increasing the temperature of the high pressure produced gas before feeding into the energy conversion device. Therefore, it may be beneficial to increase the temperature of the produced gas before passing through an energy conversion device. Using renewable energy sources to increase the temperature of the produced gas may be a viable option. Concentrated solar thermal power is an inexhaustible source that has high reliability and predictable cost for power production. Using concentrated solar thermal power to heat a produced gas before passing through an energy conversion device, more energy can be produced. Concentrated solar thermal power may be used for both short-term and long-term energy sources for heating produced gas in order to power generation in gas wells. Concentrated solar thermal power may be utilized for storing heated material in an inexpensive and efficient thermal energy storage system for future use.

Embodiments herein relate to a process and a system for producing gas and generating power. The process includes a few stages including first producing a gas from an underground formation or reservoir, then heating the produced gas to increase its temperature and/or pressure, and finally expanding the heated produced gas across an energy conversion device to produce electricity. The process of heating the produced gas includes indirect heat exchange. A material is first heated using a concentrated solar system and then used in the indirect heat exchange system as a heat exchange medium to exchange thermal energy from the heat exchange medium to the produced gas in order to increase the temperature of the produced gas. This results in cooling of the heat exchange medium. The heat exchange medium is then again heated via concentrated solar power.

The system according to embodiments herein includes a production pipe for transporting a produced gas from a wellhead to an energy conversion device, an indirect heat exchange system for heating the produced gas intermediate the wellhead and the energy conversion device, a concentrated solar power system for heating a heat exchange medium; and a heat exchange circulation system for circulating the heat exchange medium through the indirect heat exchange system.

As used herein, "heat exchange medium" is a material that transports heat from a place of higher temperature to a place of lower temperature in a heating or cooling circuit. A heat transfer medium in the most general sense may be present in the solid, liquid, and/or vapor phase. Heat exchange medium can also be used to store heat in a reversible form and can be circulated within a system via pipes or such. In one or more embodiments, a molten salt may be used as a heat exchange medium, and a parabolic sun collector may be used to heat up the molten salt. The heating process may increase the temperature of the molten salt from a first temperature to a second temperature that is higher than the first temperature. The heat in the molten salt may then be utilized via indirect heat exchange to heat up a produced gas, such as in the production pipe downstream of the Christmas tree and upstream of the energy conversion device, or in a heat exchanger that may be positioned in between a Christmas tree and a turboexpander, or both. The molten salt may be pumped and used as a heat tracing mechanism of the production pipe. The produced gas temperature may be increased; however, it is desirable to keep the temperature below the ignition temperature of the produced gas. The higher gas temperature results in an increase in the energy produced from the gas.

As used herein "an energy conversion device" means a system that converts one form of energy to another form of energy. An example of such an energy conversion device may be a turboexpander. The turboexpander is an energy conversion device that converts the energy contained in the flowing produced gas to a rotating mechanical work that can be utilized for various applications. A turboexpander is a rotating machine with an expansion turbine that converts the energy contained in a gas into mechanical work, much like a steam or gas turbine. A steam or gas turbine's goal is to convert the mechanical work into useful power, by either driving an electric generator or being the prime mover for another rotating machine, such as a compressor or a high-power pump. A turboexpander also referred to as a turbo-expander or an expansion turbine, is a centrifugal or axial-flow turbine, through which high-pressure gas is expanded to produce work that is often used to drive a compressor or generator. Turbo-expanders provide a way to capture the energy lost in natural gas facilities and refineries. Turbo-expanders have a range of applications, but this template focuses on the use of turbo-expanders for energy recovery and power generation. In general, any high-temperature or high-pressure gas is a potential resource for energy recovery. A turboexpander may convert the kinetic energy of a gas to electricity by utilizing at least a turbine and an electrical generator. A gas at a high pressure may be fed into a turboexpander that may force a turbine in the turboexpander to spin or create a circular motion. A generator may be coupled with the turbine, and therefore, the spin may allow the generator to produce power or electricity. The power produced from a turboexpander or power output may be proportional to the pressure ratio, temperature, and flow rate of gas in the stream. Some turbo-expanders have been designed and built specifically for hot gas services but often steam turbines have been adapted and used. These latter units feature the same working principle as conventional steam turbines except for the working fluid. However, because the operating, thermodynamic and fluid-dynamic behavior of a hot gas in each service differs from that of steam, the successful application requires many checks and verifications to avoid potential problems or issues. Turbo-expander is widely used in oil and gas operations. Applications are different for each operation, but the utilization is to generate electricity to power some part of the facility or support an existing system.

In one or more embodiments, a Christmas tree may be attached to a wellhead to extract or produce gas from a wellbore. A Christmas tree is an assembly of valves, spools, chokes, and fittings. There may be several valves in a Christmas tree including a kill wing valve, a swab valve, a production wing valve, an upper master valve, and a lower master valve. Christmas trees are widely used for many oil and gas applications including in oil wells, gas wells, water disposal wells, water injection wells, and gas injection wells. The primary purpose of using a Christmas tree is to control the flow of fluids such as aqueous fluids, oils, or hydrocarbons in general into and out of a well during production. Christmas tree also includes important functions in applications including well intervention, pressure relief, chemical injection, tree, and well monitoring points, flow composition and rate, valve and choke position feedback, and connection points.

FIG. 1 shows a system 100 for producing gas and generating power in accordance with one or more embodiments of the present disclosure. The system 100 is situated over the ground 119, a Christmas tree 106 is connected to a wellbore 120 through the wellhead (not shown in the figure). A produced gas 121 is extracted from a formation through the wellbore 120. The system 112 includes a production pipe 114 for transporting the produced gas 121 from the Christmas tree 106 to an indirect heat exchange system 104. The indirect heat exchange system 104 is configured to exchange heat between the heat exchange medium 108 and the produced gas 121. The indirect heat exchange system 104 is used to increase the temperature of the produced gas 121 from a first temperature to a second temperature by using heat from a heat exchange medium 108, thereby also increasing the pressure or flow rate of the produced gas.

The heat exchange medium 108 is circulated through a thermal storage unit 102, the indirect heat exchange system 104, and the concentrated solar power system 101. The concentrated solar power system 101 is used to increase the temperature of the heat exchange medium 108 from a first temperature to a second temperature, where the second temperature is higher than the first temperature. After heating, the heat exchange medium 108 is transported through a pipe 103 and stored in thermal storage unit 102. A pump 105 is then used to feed the heat exchange medium 108 from the thermal storage unit 102 into the indirect heat exchange system 104. In the indirect heat exchange system 104, the produced gas 121 and the heated heat exchange medium come in indirect thermal contact, and therefore, the temperature of the produced gas 121 increases.

The heated produced gas 122 is then fed into an energy conversion device 109 through a pipeline 111. The energy conversion device 109 may be a turboexpander generator that uses the thermal energy of the heated produced gas 122 to produce electricity. After expanding the heated produced gas 122, the pressure of the heated produced gas 122 decreases. The low-pressure produced gas 116 is then transported through a pipeline 110 to a processing area 117 for further conversion or processes. A choke valve 118 restricts the flow of the low-pressure produced gas 116 from further getting into the indirect heat exchange system 104.

Furthermore, after transferring heat from the heat exchange medium 108 to the produced gas 121 to increase the temperature of the produced gas, the temperature of the heat exchange medium 108 drops to a lower temperature. The heat exchange medium 108 is then circulated from the indirect heat exchange system 104 to the concentrated solar power system 101.

Figure 2:
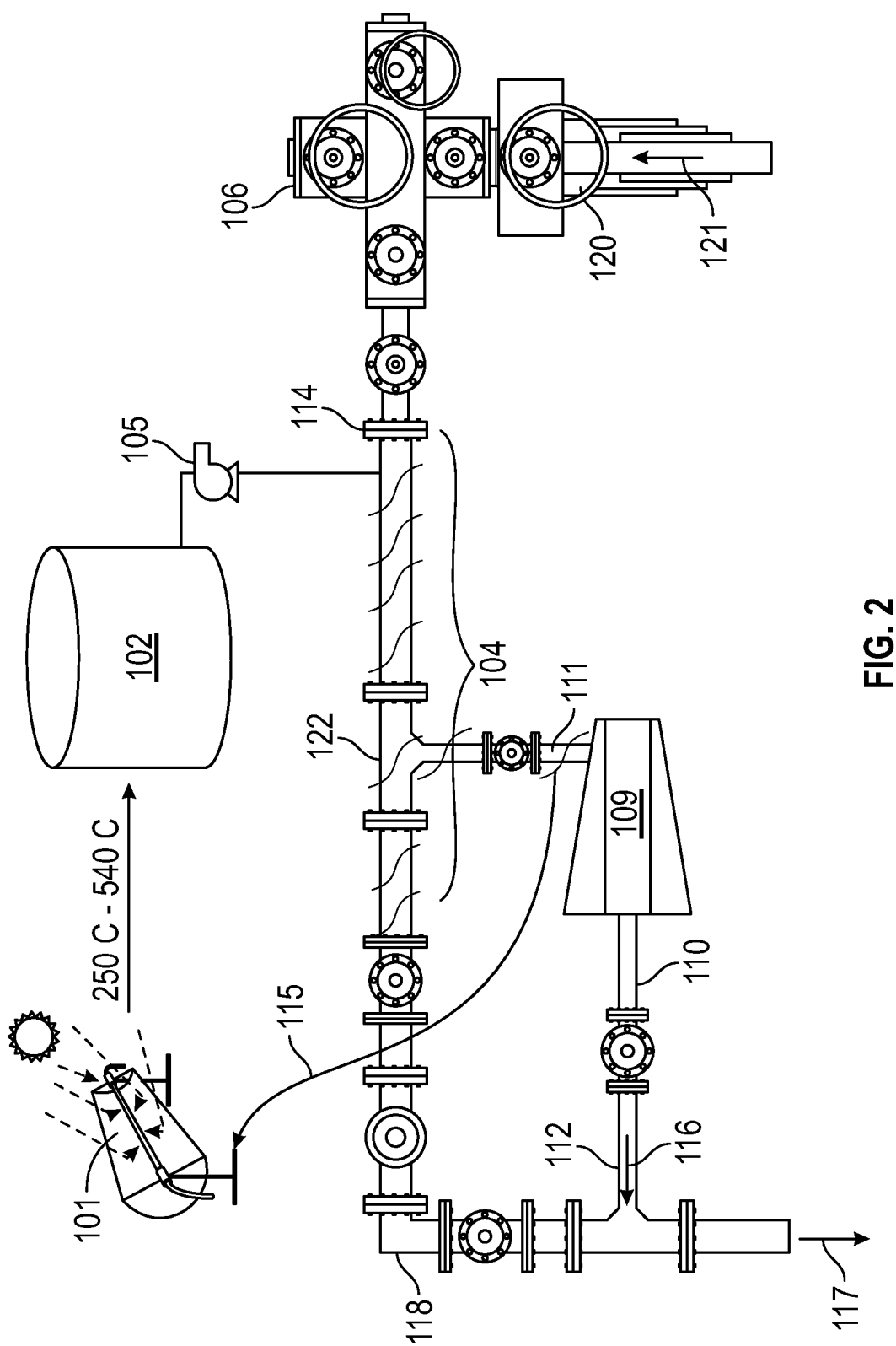
FIG. 2 illustrates a system for enhancing power generation in gas wells in accordance with one or more embodiments of the present disclosure.

FIG. 2 shows another embodiment of a system 100 for producing gas and generating power in accordance with the present disclosure, where like numerals represent like parts. In this embodiment, rather than a dedicated heat exchanger disposed between the Christmas tree and the energy conversion device, the produced gas may be heated by indirect heat exchange using heat tracing on the production pipe. Similar to the embodiment of FIG. 1, a heat exchange medium is heated by a concentrated solar power system 101, stored in a thermal storage unit 102, pumped from the thermal storage unit 102 to an indirect heat exchange system 104 via a pump 105. In this embodiment, indirect heat exchange system 104 includes tubing surrounding the production pipe (heat tracing) to provide indirect heat exchange between the heat exchange fluid and the produced gas 121. The heat exchange fluid exchanges heat with a produced gas 121 and lose heat in the process. After cooling down, the heat exchange fluid is recycled back to the concentrated solar power system 101 via a pipe 115 to be reheated and stored for future use.

In yet other embodiments, indirect heat exchange system 104 may include a combination of heat tracing and a heat exchanger. Further, recognizing that solar energy is only available part of a day, a "cold" tank and a "hot" tank may be provided for heat exchange medium storage and circulation, avoiding a gradual cooling of the storage tank contents overnight as would otherwise result due to continued circulation and heat exchange with the produced gas.

The heat exchange medium is configured to receive heat from the solar energy and pass the thermal energy to the produced gas. The amount of thermal energy carried by the heat transfer medium may be dependent on the heat capacity of the composition.

In one or more embodiments, the heat exchange medium may be molten salt. The heated molten salt may be stored in a thermal storage vessel to be utilized during night times. The stored salt may then be used as a heat tracer for the production pipe or as a heat exchange fluid to increase the temperature of the produced gas. The thermal storage may be used for molten salt storage and positioned between the concentrated solar power system and the energy conversion device.

In one or more embodiments, after transferring heat from the molten salt to the produced gas, the temperature of the molten salt may drop. The cool molten salt may then be circulated to the parabolic sun collector system to be reheated for further use. In one or more embodiments, the molten salt may be pumped and used as a new heat tracing mechanism of the production pipe with which to increase the gas temperature below the ignition temperature, making the energy of the gas to increase dramatically.

In one or more embodiments, using a parabolic solar collector system, the temperature of the molten salt may be increased to a temperature in a range from 280° C. to 540° C.

Concentrated solar power systems useful in embodiments herein may include various devices or systems useful for capturing and storing solar energy. For example, in one or more embodiments, concentrated solar power may be captured by utilizing mirrors or lenses to concentrate a large area of sunlight onto a receiver. Mirrors of different shapes may be used; a few non-limiting examples may be rectangular, curved (U-shaped), and a combination of smaller flat mirrors formed into a parabolic dish-shaped mirror. Such mirrors may be placed as tilted toward the sun and used to collect the sun's energy by focusing sunlight on tubes (or receivers) that run the length or any other dimension of the mirrors. The reflected sunlight may be used to heat a fluid flowing through the tubes.

In one or more embodiments, parabolic trough systems may be used as solar collectors. In parabolic trough systems, receiver tubes are positioned along the focal line of each parabolic mirror. A parabolic solar thermal collector is straight in one dimension and curved in the other dimensions. The curvature may be a parabola in the other two dimensions and lined with a polished metal mirror. In one or more embodiments, linear Fresnel reflector systems may be used as solar collectors. In linear Fresnel reflector systems, one receiver tube may be positioned above several mirrors to allow the mirrors to have mobility in order to track the direction of the sun as it moves during the day. The sunlight which enters the mirror parallel to its plane of symmetry is focused along the focal line. The heat exchanger fluid may be positioned along the same focal line for heating. In one or more embodiments, a power tower may be used as solar collector. A power tower is a collection of a large number of flat, sun-tracking mirrors that may focus sunlight onto a receiver at the top of a tall tower. A heat-transfer fluid may be heated in the receiver and may be used to heat a heat transfer fluid. The thermal fluid may be used in a conventional turbine generator to produce electricity.

In one or more embodiments, using such parabolic sun collector may help increase the produced gas temperature, and the higher temperature of produced gas increases the output power of the turboexpander, which may result in an overall increased efficiency or an overall increased energy production (e.g., electricity output).

In one or more embodiments, the energy conversion device 109 may be a turboexpander. The turboexpander may be a direct drive, or external gearbox, or integral gearbox, or a multi-stage turbo-expander. The turboexpander may withstand a harsh operational environment including highly corrosive gases including $CO_2$ and $H_2S$, high temp and high pressure. In one or more embodiments, a series of turbo-expanders may be used where the gas outlet of a first turbo-expander is connected to the gas inlet of a second turbo-expander and such.

In one or more embodiments, power may be generated by a turbo-expander through optionally utilizing a separate heat exchanger in series or parallel with the indirect heat exchange system 104 for heating a boiler to generate a steam for rotating a steam turbine.

In one or more embodiments, the heat exchange medium may also be used to raise or maintain the pipe temperature during oil and gas operations. The heat exchange medium used for heating of the produced gas may additionally be used for heating and preventing freeze-off of wellhead equipment that may otherwise utilize radiant heat from a flameless heater to prevent freeze-off, for example.

In one or more embodiments, the indirect heat exchange system may include heat transfer from the molten salt to an adjacent pipe first, and then heat transfer from the pipe to the produced gas in the pipe—all being in thermal contact with each other.

In one or more embodiments, turbo-expanders may be coupled with a second power generator such as a fuel cell or conventional fuel combusting generator. This secondary generator may produce waste heat that may be used to offset the cooling effect of the turbo-expander. This symbiosis between the turbo-expander and secondary generator may increase the net efficiency of the entire system.

In one or more embodiments, the turboexpander may be in series connection with the Christmas tree to directly utilize the kinetic energy from the natural gas extracted from gas wells by converting the gas flow into usable electrical energy through the turboexpander.

In one or more embodiments, the power generator output may increase by a significant amount as heating is applied to the gas before it enters the turboexpander. In one or more embodiments, the power generator output may increase from 25 to 200% as heating is applied to the produced gas before it enters the turboexpander compared to a non-heated produced gas. The % increase in power generator output may depend on the temperature difference of the produced gas before and after heating. For example, the power generator output may increase by a lower limit of any one of 25%, 30%, 50%, 75%, 100%, 125%, 150%, and 175%, where any lower limit may be paired with any mathematically compatible upper limit. For another example, the power generator output may increase by an upper limit of any one of 50%, 75%, 100%, 125%, 150%, 175%, and 200%, where any upper limit may be paired with any mathematically compatible lower limit.

Additionally, the use of concentrated solar power to heat a produced gas may make energy conversion viable for low-pressure gas systems, allowing electricity to be produced from what would otherwise be an unviable source.

In one or more embodiments, the system may be utilized to produce electricity for remote locations where it is needed to have more power generated.

EXAMPLE

An example calculation is given on the overall power increase from using the system and process according to one or more embodiments described herein. The calculation formula used for the power increase is as follows:

$$Q = \dot{m} C_p (\Delta T)$$

Where Q is the thermal energy, $\dot{m}$ is the mass flow rate of the produced gas, $C_p$ is the specific heat of the produced gas and $\Delta T$ is the temperature difference between before and after heating the produced gas using the process according to the embodiments.

Considering the pipe or vessel structures as conventionally used systems that can withstand any given temperature and pressure, assume the mass flow rate as 5681 kg/hr, the specific heat as 2.21 kJ/kg° C., and the initial temperature of the produced gas as 66° C. before heating, and the final temperature of the produced gas as 450° C. after indirectly heating using a heat exchange medium, substituting the values into the formula:

$$Q = 5681 \times 2.21 \times (450-66) = 1339.2 \text{ KW}$$

Therefore, using the process and system according to the embodiments, 1339.2 KW of excess energy per well can be generated per hour. Assuming the unit energy price as $0.093 per KWh, this is equivalent to $3000/day, or $1,080,000/year if the electricity was distributed into a residential area.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" and similar terms refers to a subsequently described event or circumstance that may or may not occur. The description includes instances where the event or circumstance occurs and instances where it does not occur.

"Substantially" and similar terms refers to a majority of, or mostly, as in at least about 50%, 60%, 70%, 80%, 90%, 95%, 96%, 97%, 98%, 99%, 99.5%, 99.9%, 99.99%, or at least about 99.999% or more.

When the word "approximately" or "about" is used, this term may mean that there can be a variance in the value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While particular embodiments of the invention have been described, it will be understood that the invention is not limited thereto, since many modifications can be made, and it is intended to include within the invention any such modifications as fall within the scope of the claims.

While the disclosure includes a limited number of embodiments, those skilled in the art, having the benefit of this disclosure, will appreciate that other embodiments may be devised which do not depart from the scope of the present disclosure. Accordingly, the scope should be limited only by the attached claims.

Embodiments of the present disclosure may provide at least one of the following advantages. The power availability to remote gas or oil wells' locations may ensure a reliable power source and access power that can be transmitted back to the grid. Also, the system may increase the efficiency of the remote power generation using the natural reservoir pressure to run the turboexpander.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A process for producing gas and generating power or electricity, comprising:
   producing hydrocarbon gas from an underground reservoir, a produced hydrocarbon gas being at a first temperature;
   heating a heat exchange medium via concentrated solar power to increase a temperature of the heat exchange medium;
   heating the produced hydrocarbon gas, via indirect heat exchange with the heat exchange medium, to a second temperature, producing a heated produced hydrocarbon gas and a cooled heat exchange medium; and
   expanding the heated produced hydrocarbon gas across an energy conversion device to convert energy contained in the gas to another form of energy,
   wherein:
      the indirect heat exchange is conducted via an indirect heat exchange system,
      the expanding produces a low-pressure produced hydrocarbon gas, and
      the low-pressure produced hydrocarbon gas is prevented from further getting into the indirect heat exchange system.
2. The process of claim 1, further comprising:
   reheating the cooled heat exchange medium after exchanging heat with the produced hydrocarbon gas, via concentrated solar power.
3. The process of claim 1, wherein the heat exchange medium is molten salt.
4. The process of claim 1,
   wherein the energy conversion device is a turboexpander that includes a turbine and an electricity generator.
5. The process of claim 1,
   wherein the indirect heat exchange is via heat tracing of production pipe fluidly transporting the produced hydrocarbon gas from a wellhead to the energy conversion device.
6. The process of claim 5,
   wherein the indirect heat exchange is via a heat exchanger disposed intermediate the wellhead and the energy conversion device.
7. The process of claim 1, further comprising:
   circulating molten salt by utilizing a pump; and
   storing molten salt in a thermal storage vessel.
8. A system for producing hydrocarbon gas and generating power, comprising:
   a production pipe for transporting a produced hydrocarbon gas from a wellhead to an energy conversion device;
   an indirect heat exchange system for heating the produced hydrocarbon gas intermediate the wellhead and the energy conversion device;
   a concentrated solar power system for heating a heat exchange medium;
   a heat exchange circulation system for circulating the heat exchange medium through the indirect heat exchange system, and
   a pipeline positioned downstream of the energy conversion device for transporting the produced hydrocarbon gas out of the system for producing hydrocarbon gas and generating power.
9. The system of claim 8, wherein the energy conversion device is a turboexpander that includes a turbine and an electricity generator.
10. The system of claim 8, further comprising:
    an additional energy conversion device coupled with the energy conversion device of the system.
11. The system of claim 8, wherein the heat exchange circulation system may include a plurality of pumps and/or a plurality of storage vessels.
12. The system of claim 8, wherein the wellhead comprises a Christmas tree.
13. The system of claim 8, further comprising a thermal storage unit for storing heated molten salt, wherein the thermal storage unit is positioned between the concentrated solar power system and the energy conversion device.
14. The system of claim 12, wherein the indirect heat exchange system includes a heat exchanger configured to exchange heat between the heat exchange medium and a produced hydrocarbon gas in the production pipe wherein the heat exchanger is positioned between the energy conversion device and the Christmas tree.
15. The system of claim 8, wherein the indirect heat exchange system comprises heat tracing of production pipe intermediate a Christmas tree connected to a wellhead and the energy conversion device.
16. The system of claim 8, further comprising heat tracing of wellhead equipment via the heat exchange medium.
17. The system of claim 8, wherein the heat exchange circulation system comprises a plurality of pumps to circulate the heat exchange medium from a first position to a second position in the system.
18. The system of claim 8, wherein the concentrated solar power system includes a parabolic solar collector.

* * * * *